Figure 1:
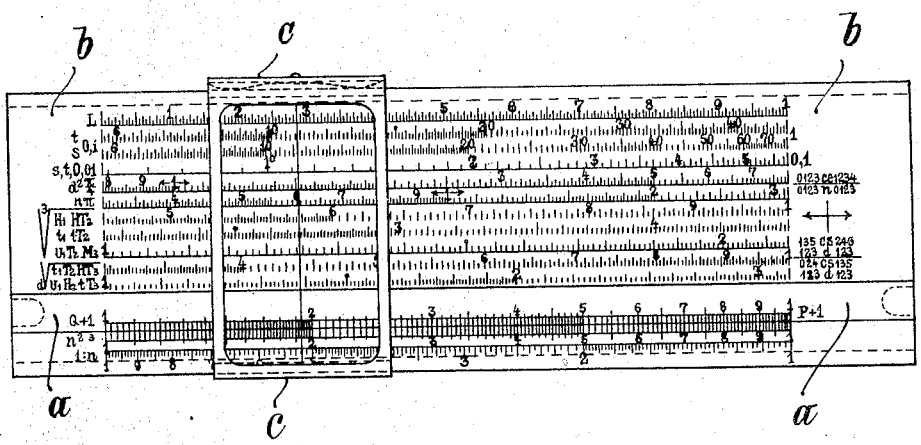

G. R. F. H. CUNTZ.
SLIDE RULE CALCULATOR.
APPLICATION FILED NOV. 18, 1913.

1,168,059.

Patented Jan. 11, 1916.

Witnesses
Floyd R. Cornwall
L. M. Myer

Inventor
G. R. F. H. Cuntz.
By _____ Atty.

UNITED STATES PATENT OFFICE.

GREGOR RUDOLF FERDINAND HEINRICH CUNTZ, OF HAMBURG, GERMANY.

SLIDE-RULE CALCULATOR.

1,168,059.  Specification of Letters Patent.  Patented Jan. 11, 1916.

Application filed November 18, 1913. Serial No. 801,702.

*To all whom it may concern:*

Be it known that I, GREGOR RUDOLF FERDINAND HEINRICH CUNTZ, engineer, a subject of the German Emperor, residing at No. 2 Nachtigallenstrasse, Hamburg, Germany, have invented new and useful Improvements in Slide-Rule Calculators, of which the following is a specification.

This invention relates to a slide rule.

It is the object of the invention to provide such a slide rule with extra scales which can be used for many different forms of calculations.

Another object is to increase the size of the scales, and thus to obtain greater accuracy.

A still further object is to facilitate the reading of the results by a tabulation of the values with the positions in which they lie.

It has been proposed previously to provide in a calculating machine scales parallel with the logarithmic scale of the numbers, the reciprocal of the numbers, the squares and cubes of the numbers, and the sines and tangents of angles corresponding to the numbers. It has also been proposed to provide a slide rule with a number of parallel scales arranged in geometrical progression of the base 10, or powers and roots of 10, and showing also sines and tangents of angles, and scales having as a base fractions of numbers. According to the present invention a slide rule is provided with square and cube root scales divided into two and three parallel rows respectively, and scales for the circumference and areas of circles. The slide rule, according to this invention, is also provided with signs to indicate the position of the decimal point in the result, for all forms of calculations provided by the rule.

The invention is illustrated in the drawing, wherein—

Figure 2:
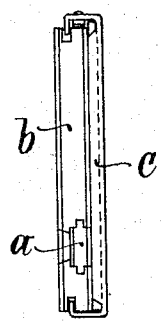

Figure 1 shows a plan view. Fig. 2 is an end view of the slide rule.

On the stock $b$ is a scale, identified at the left by the characters $n^{2\,3}$. On this stock there is also a reciprocal scale, identified at the left by the character $1:n$. On the slide $a$ is a scale $Q+1$, which corresponds in all respects to the scale $n^{2\,3}$. On the stock immediately above the slide is a pair of scales which are the square root scales for the different decimal orders, the lower scale marked $U_1$, $H_2$, $tT_3$, being for such decimal orders as units, hundred, tens of thousands, and the like, while the upper scale marked $t_1\,T_2\,HT_3$ is used for such decimal orders as tens, thousands, and the like. Immediately above this scale are the cube root scales, the lower one of which is marked $U_1$, $T_2$, $M_3$, and is used for decimal orders such as units, thousands, millions and the like. Immediately above this is a cube root scale marked $t_1\,tT_2$, which is used for such decimal orders as tens, tens of thousands, and the like. Immediately above this is a third cube root scale marked $H_1$, $HT_2$, and which is used for hundreds, hundred thousands, hundred millions, and the like in the decimal orders. Above this last scale is a scale marked $n\pi$, which is the scale used for calculating circumferences. Above this last scale is a scale marked $d^2\frac{\pi}{4}$ used for calculating the areas of circles. Above this again, comes a scale marked $s$, $t$, 0.01, this scale being used for calculating the sines and tangents of various small angles, where there is no substantial difference between the sine and tangent. Above this is a sine scale marked $s$, while above the latter is the tangent scale marked $t$. The series is concluded by the logarithmic base scale F. By setting the cursor at any point on the scale $n$, $n^2$, $n^3$, as for instance 1.93, there may be read directly on the scale of circumferences the circumference of a circle of such diameter on the scale of areas of circles, the area of a circle of such diameter. At the same time such a setting gives the square root of 1.93 directly on the lower scale of squares and the square root of 19.3 on the upper scale of square roots. Also there is obtained the cube root of 1.93 on the lower cube root scale, the cube root of 19.3 on the lower cube root scale and the cube root of 193 on the upper cube root scale. The sine and tangent scales are used in the manner known in the art, as are also the logarithmic and reciprocal scales, as well as the slide.

Having thus described the invention, what is claimed as new, is:—

1. In a slide rule, a stock provided at one edge with the logarithmically divided scale and having arranged oppositely thereto a plurality of root scales logarithmically divided and being arranged to indicate different decimal orders, the roots corresponding to different decimal writings on the first scale.

2. In a slide rule, a stock provided at one edge with the logarithmically divided scale and having arranged oppositely thereto a plurality of root scales logarithmically divided and being arranged to indicate different decimal orders, the roots corresponding to different decimal writings on the first scale, said plurality of scales equaling in number the different decimal orders essentially involved in the root to be extracted.

In testimony whereof I have signed my name to this specification in the presence of two subscribing witnesses, this 4th day of November, 1913.

GREGOR RUDOLF FERDINAND
HEINRICH CUNTZ.

Witnesses:
FRIEDR. JULIUS TOSHS,
ERNEST H. L. MUMMENHOFF.